(12) United States Patent
Fainstain

(10) Patent No.: US 7,956,871 B2
(45) Date of Patent: Jun. 7, 2011

(54) COLOR DISPARITY CORRECTION IN IMAGE SENSORS METHODS AND CIRCUITS

(75) Inventor: Eugene Fainstain, Natania (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 985 days.

(21) Appl. No.: 11/413,605

(22) Filed: Apr. 27, 2006

(65) Prior Publication Data

US 2007/0109316 A1    May 17, 2007

Related U.S. Application Data

(60) Provisional application No. 60/675,969, filed on Apr. 28, 2005.

(51) Int. Cl.
*G09G 5/00* (2006.01)
(52) U.S. Cl. ...................................................... 345/606
(58) Field of Classification Search .................... 345/606
See application file for complete search history.

(56) References Cited

U.S. PATENT DOCUMENTS

| 2006/0055794 | A1* | 3/2006 | Sato et al. | 348/222.1 |
| 2006/0098868 | A1 | 5/2006 | Fainstain et al. | |
| 2006/0221226 | A1* | 10/2006 | Yanof et al. | 348/346 |

FOREIGN PATENT DOCUMENTS

WO    WO 03098941 A1 * 11/2003

OTHER PUBLICATIONS

Agranov, Gennadiy et al., Crosstalk and Microlens Study in a Color CMOS Image Sensor, IEEE Transactions on Electron Devices, vol. 50, No. 1, pp. 4-11, Jan. 2003.
"Anatomy of a Digital Camera: Image Sensors," http://www.extremetech.com/article2/0,1558, 32 pages, printed Jun. 21, 2005.

* cited by examiner

*Primary Examiner* — Aaron M Richer
(74) *Attorney, Agent, or Firm* — Harness, Dickey & Pierce, P.L.C.

(57) ABSTRACT

A method of displaying a captured image includes using an array of pixels to capture an image. The array of pixels includes a first plurality of pixels of a first color, a second plurality of pixels of a second color, and a third plurality of pixels of a third color. The pixels are arranged into rows and columns and the pixels of the third plurality of pixels have two different arrangements within the array of pixels with respect to neighboring pixels. The method includes, for each pixel in the third plurality of pixels, normalizing the pixel's value as a function of the pixel values of at least six other pixels in the third plurality of pixels. The method also includes displaying the captured image using a normalized value for the pixel value of each pixel in the third plurality of pixels.

21 Claims, 5 Drawing Sheets

100

| Gb (green-B) | B (blue) | Gb (Green-B) | B (blue) | Gb (Green-B) |
|---|---|---|---|---|
| R11 (red) | Gr12 (green-R) | R13 (red) | Gr14 (green-R) | R15 (red) |
| Gb21 (green-B) | B22 (blue) | Gb23 (Green-B) | B24 (blue) | Gb25 (Green-B) |
| R31 (red) | Gr32 (green-R) | R33 (red) | Gr34 (green-R) | R35 (red) |
| Gb (green-B) | B (blue) | Gb (Green-B) | B (blue) | Gb (Green-B) |

102

FIG. 1

COLOR DISPARITY CORRECTION IN IMAGE SENSORS METHODS AND CIRCUITS

CROSS-REFERENCES TO RELATED APPLICATIONS

This application is a non-provisional of, and claims the benefit of, co-pending, commonly-assigned, U.S. Provisional Patent Application No. 60/675,969 entitled "GREEN EQUALIZER," filed on Apr. 28, 2005, by Fainstain.

This application is related to the following co-pending, commonly assigned U.S. patent applications, the entirety of each of which are incorporated herein by reference for all purposes: U.S. application Ser. No. 11/107,387, filed on Apr. 14, 2005, entitled "SYSTEMS AND METHODS FOR CORRECTING GREEN DISPARITY IN IMAGER SENSORS," and U.S. application Ser. No. 60/562,630, filed on Apr. 14, 2004, entitled "GREEN DISPARITY CORRECTION FOR CMOS IMAGERS—METHODS AND CIRCUITS."

FIELD OF THE INVENTION

Embodiments of the invention relate generally to systems and methods for dynamically correcting green disparity in an image sensor. More specifically, embodiments of the present invention relate to correcting pixel outputs from a pixel array in an image sensor at the Bayer domain for disparity of the two types of green pixels.

BACKGROUND OF THE INVENTION

Most image sensors include an array of pixels arranged into rows and columns. In most color image sensors, each pixel in the image sensor array is associated with a color filter that passes light with certain wavelength properties to thereby capture a color image. Most color filter arrays include a combination of red, blue and green filters.

Typical color filters have a period of two columns in the horizontal dimension and two rows in the vertical dimension. Hence, the array includes identical units of 2×2 pixels. Typical units include a red filter, a blue filter, and two green filters. The associated pixels may be referred to by the color of the corresponding filter.

A Bayer filter array is one example of a filter array having identical 2×2 pixel units. In a Bayer filter array, the two green pixels are diagonal to one another. When placed in an array having many units, some green pixels are located in otherwise red pixel rows, while the remaining green pixels are in otherwise blue pixel rows. The green pixels located in a blue pixel row may be noted as "Gb," or "green-B." Green pixels located in a red pixel row may be noted as "Gr," or "green-R."

From the filter's perspective, the two types of green pixels are the same. From the pixel's perspective, however, the two green pixels are distinctly different. Because some of the light diagonally incident on a pixel may have passed through neighboring filters of a different color (a phenomena known as "color cross talk", explained more fully in previously-incorporated U.S. application Ser. No. 11/107,387), the resulting distortion may be different for the two types of green pixels, which have different neighboring pixels. Moreover, in shared-transistor pixel techniques, the layout of a group of pixels sharing certain common transistors may not be identical. This is yet another source of disparity between the two types of green pixels. Electrical cross-talk between the circuitry of the two types of green pixels and their neighbors may create additional unsymmetrical distortion.

Efforts to normalize distortion levels of the two types of green pixels include:
Process engineering efforts to minimize the height of the color-filter-array and its vertical distance from the active area of the pixels. This serves to decrease the amount of color cross talk described above;
Layout techniques to assure that the geometrical structure, including the environment of the two green pixel types is as identical as possible; and
Calculation of the green disparity as a function of the x and y location of each pixel, and on line application of a correction factor—such as described in previously-incorporated U.S. application Ser. No. 11/107,387.
The results of these efforts, however, are less than perfect.

BRIEF SUMMARY OF THE INVENTION

Embodiments of the invention provide a method of displaying a captured image. The method includes using an array of pixels to capture an image. The array of pixels includes a first plurality of pixels of a first color, a second plurality of pixels of a second color, and a third plurality of pixels of a third color. The pixels are arranged into rows and columns and the pixels of the third plurality of pixels have two different arrangements within the array of pixels with respect to neighboring pixels. The method includes, for each pixel in the third plurality of pixels, normalizing the pixel's value as a function of the pixel values of at least six other pixels in the third plurality of pixels. The method also includes displaying the captured image using a normalized value for the pixel value of each pixel in the third plurality of pixels.

In some embodiments the third color comprises green. The method may include preprocessing the pixel value. The method also may include post-processing the pixel value. The array of pixels may be arranged into a Bayer array. The first arrangement of the two different arrangements may include a green pixel having red pixels in its row and blue pixels in its column and the second arrangement of the two different arrangements may include a green pixel having blue pixels in its row and red pixels in its column. Normalizing a pixel's value may include combining the values of four pixels that are immediately diagonally adjacent to the pixel to produce a first average, combining the first average with the pixel's value to produce a second average, and combining limited pixel values for the four pixels that are immediately diagonally adjacent to the pixel to produce a third average. The limited pixel values are a function of the second average. Normalizing a pixel's value also may include combining limited pixel values for two additional pixels in the third plurality of pixels to produce a fourth average. The limited pixel values are a function of the second average and the two additional pixels include two pixels nearest the pixel that are not immediately adjacent to the pixel. Normalizing a pixel's value also may include subtracting the fourth average from the third average to produce a result, dividing the result by two to produce a divided result, and combining the divided result with the pixel's value to produce a normalized pixel value. Combining, in each instance, may include adding the values followed by truncating one or more least significant bits. Combining, in each instance, may include averaging the values followed by rounding the result to the nearest integer. The two additional pixels may be in the same row as the pixel. The two additional pixels may be in the same column as the pixel. The limited pixel values may be a monotonic function of the second average. The limited pixel values may be a non-monotonic function of the second average.

Other embodiments provide a method of displaying an image captured by an image sensor array. The array includes a plurality of red pixels, a plurality of blue pixels, and a plurality of green pixels arranged in a Bayer array. Each pixel has a pixel value associated therewith. The pixels are arranged into rows and columns, a first plurality of the green pixels, designated Gr pixels, are in rows of pixels having only red and green pixels, and a second plurality of the green pixels, designated Gb pixels, are in rows of pixels having only blue and green pixels. The rows of pixels having Gr pixels and the rows of pixels having Gb pixels are in an alternating relationship in the image sensor array. The method includes, for each of a plurality of Gb pixels in the pixel array, receiving a pixel value for the Gb pixel, the Gb pixel being a subject pixel; receiving pixel values for four Gr pixels that are in an immediately adjacent diagonal relationship with the subject Gb pixel, receiving pixel values for two additional Gb pixels, the subject Gb pixel and the two additional Gb pixels being comprised by a common row and the subject Gb pixel being between the two additional Gb pixels, and the two additional Gb pixels being each in an immediately adjacent diagonal relationship with two of the four Gr pixels. The method also includes combining the pixel values of the four Gr pixels to produce Avg(Gr), combining the pixel value of the subject Gb pixel with Avg(Gr) to produce LimInput, combining limited pixel values of the four Gr pixels to produce LimAvg(Gr), the limited pixel values being a function of LimInput, combining limited pixel values of the two remaining Gb pixels to produce LimAvg(Gb), the limited pixel values being a function of LimInput, and subtracting LimAvg(Gb) from LimAvg(Gr), dividing the result by two, then using the divided result to correct the pixel value of the subject Gb pixel, thereby producing a corrected pixel value. The method further includes displaying the captured image using one or more corrected pixel values.

In some embodiments, the method further includes, for each of a plurality of Gr pixels in the pixel array, receiving a pixel value for the Gr pixel, the Gr pixel being a subject pixel, receiving pixel values for four Gb pixels that are in an immediately adjacent diagonal relationship with the subject Gr pixel, receiving pixel values for two additional Gr pixels, the subject Gr pixel and the two additional Gr pixels being comprised by a common row, the subject Gr pixel being between the two additional Gr pixels, and the two additional Gr pixels being each in an immediately adjacent diagonal relationship with two of the four Gb pixels. The method further includes combining the pixel values of the four Gb pixels to produce Avg(Gb), combining the pixel value of the subject Gr pixel with Avg(Gb) to produce LimInput, combining limited pixel values of the four Gb pixels to produce LimAvg(Gb), the limited pixel values being a function of LimInput, combining limited pixel values of the two remaining Gr pixels to produce LimAvg(Gr), the limited pixel values being a function of LimInput, and subtracting LimAvg(Gr) from LimAvg(Gb), dividing the result by two, then using the divided result to correct the pixel value of the subject Gr pixel, thereby producing a corrected pixel value. Combining, in each instance, may include adding the values followed by truncating one or more least significant bits. Combining, in each instance, may include averaging the values followed by rounding the result to the nearest integer. The limited pixel values may be a monotonic function of LimInput. The limited pixel values may be a non-monotonic function of LimInput.

Still other embodiments provide an arrangement configured to process pixel values relating to an image captured by an image capture device. The device includes an array of pixels, the array of pixels includes a first plurality of pixels of a first color, a second plurality of pixels of a second color, and a third plurality of pixels of a third color, the pixels are arranged into rows and columns, and the pixels of the third plurality of pixels have two different arrangements within the array of pixels with respect to neighboring pixels. The arrangement includes means for normalizing the pixel value of each pixel in the third plurality of pixels as a function of the pixel values of at least six other pixels in the third plurality of pixels.

In some embodiments, the third color is green. The array of pixels may be arranged into a Bayer array. The first arrangement of the two different arrangements may include a green pixel having red pixels in its row and blue pixels in its column. The second arrangement of the two different arrangements may include a green pixel having blue pixels in its row and red pixels in its column. The means for normalizing a pixel's value may include means for averaging the values of four pixels that are immediately diagonally adjacent to the pixel to produce a first average, means for averaging the first average with the pixel's value to produce a second average, means for averaging limited pixel values for the four pixels that are immediately diagonally adjacent to the pixel to produce a third average, the limited pixel values being a function of the second average, means for averaging limited pixel values for two additional pixels in the third plurality of pixels to produce a fourth average, the limited pixel values being a function of the second average and the two additional pixels being two pixels nearest the pixel that are not immediately adjacent to the pixel, means for subtracting the fourth average from the third average to produce a result, means for dividing the result by two to produce a divided result, and means for combining the divided result with the pixel's value to produce a normalized pixel value.

In still other embodiments, a circuit configured to process pixel values relating to an image captured by an image capture device includes an array of pixels. The array of pixels includes a first plurality of pixels of a first color, a second plurality of pixels of a second color, and a third plurality of pixels of a third color. The pixels are arranged into rows and columns, and the pixels of the third plurality of pixels have two different arrangements within the array of pixels with respect to neighboring pixels. The circuit includes an arrangement configured to normalize the pixel value of each pixel in the third plurality of pixels as a function of the pixel values of at least six other pixels in the third plurality of pixels. The third color may be green and the array of pixels may be arranged into a Bayer array.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 depicts a pixel array of an image sensor having pixels arranged into a Bayer array.

DETAILED DESCRIPTION OF THE INVENTION

Figure 2:
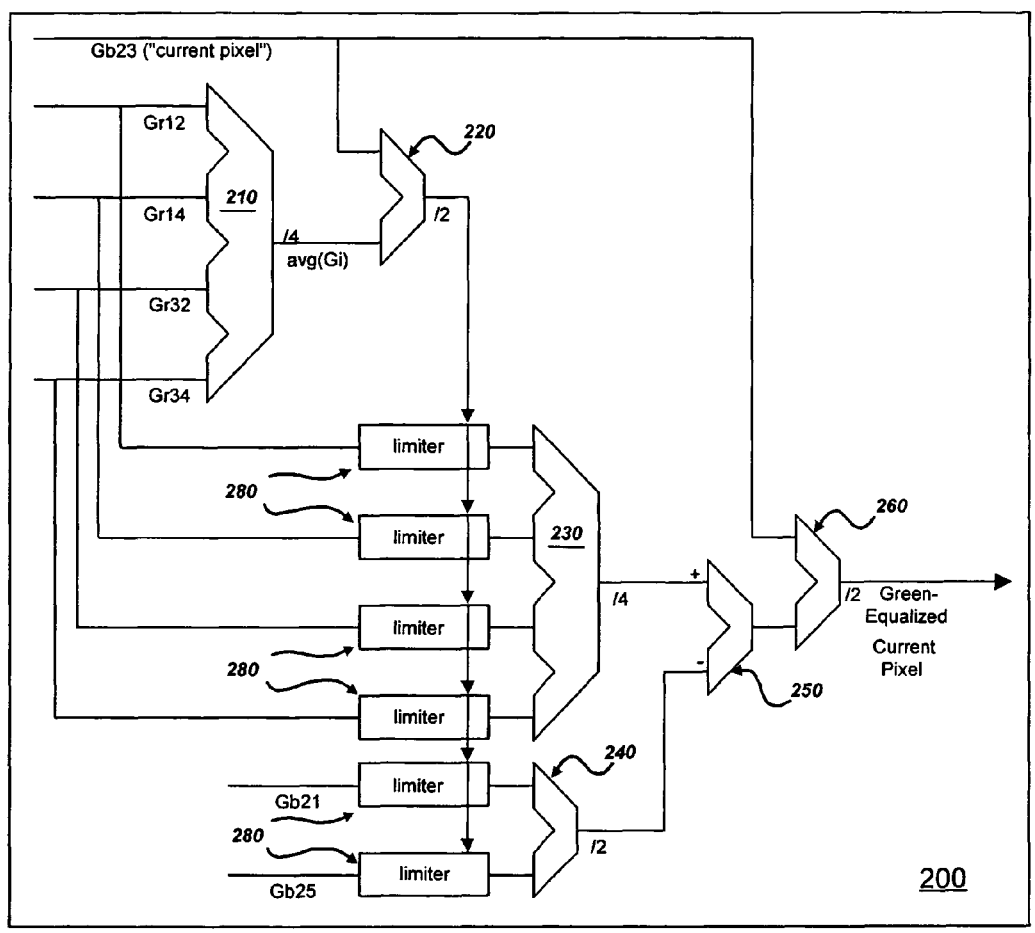
FIG. 2 depicts a block diagram of a circuit for correcting green disparity according to embodiments of the invention.

Embodiments of the present invention provide circuits and methods for correcting color disparity in image sensors. Color disparity may result from any of a number of factors, including, for example, unsymmetrical physical arrangements of pixels, their associated circuits, and filters. According to embodiments of the present invention, a particular pixel is evaluated based on nearby pixels of the same color. Depending on the comparison, the evaluated pixel's value may be adjusted. In order to provide a context for describing embodiments of the present invention, embodiments of the invention will be described herein with reference to correcting green color disparity in image sensors having a pixel array arranged into a Bayer grid, though this is not a requirement. Those skilled in the art will appreciate that the circuits and methods described herein may be applied to many other types of image sensors and pixel arrangements.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the invention, the average values of the two types of green pixels in a Bayer grid in a vicinity around each green pixel to be evaluated may each be calculated. Then, if certain conditions are met, the value of the pixel may be modified to equal the average of the two averages. To allow for the preserving of edges in the image, the neighboring pixels to be averaged may be limited by a non-linear limiting function to a value that is a function of the average of the neighboring pixels. When the pixels on one side of a line have a first value and the pixels on the other side of the line having a second value, the contribution of edge pixels to the average will be limited. The difference between the intensities of pixels fully surrounded by first value pixels and those partly surrounded by first value pixels and partly surrounded by second value pixels will be maximized, thus preserving sharp edges. The limiting function is monotonic in some embodiments and non-monotonic in other embodiments.

Having described embodiments of the invention generally, attention is directed to FIG. 1, which depicts an image sensor pixel array 100 according to embodiments of the invention. The pixels of the array 100 are arranged according to the well known Bayer array arrangement wherein red, blue, and green pixels are in a 1:1:2 ratio. Alternating rows include red and green pixels in one row, followed by a row of blue and green pixels. In other words, each 2×2 pixel group includes two green pixels in an immediately-adjacent, diagonal relationship and a red pixel and a blue pixel, also in an immediately-adjacent, diagonal relationship.

Embodiments of the invention will be described with reference to the 3×5 pixel region 102, denoted by a heavy border. Specifically, the circuit and method embodiments of the present invention will be described with reference to operating on the value of pixel Gb23. Those skilled in the art will appreciate that the ensuing description may be applied to other pixels of the array and/or other pixel colors or pixel arrangements in other embodiments.

The region 102 includes a red-green row, having three red pixels R11, R13, R15, and two green pixels Gr12, Gr14. The region also includes a blue-green row having three green pixels Gb21, Gb23, Gb25, identified as Gb, and two blue pixels B22, B24. The region also includes a second red-green row having three red pixels R31, R33, R35, and two green pixels Gr32, Gr34. The green disparity correction circuit 200 of FIG. 2 receives the pixel values of the green pixels of the region 102 as an input and produces a corrected pixel value for the subject pixel, in this case Gb23, the center pixel of the region.

Attention is directed to FIG. 2, which depicts a green disparity correction circuit 200 according to embodiments of the invention. The circuit 200 may be positioned so as to receive pixels output from an image sensor array, which pixels may have been pre-processed by one or more image signal processing functions, for example, to compensate for lens shading effects. The circuit 200 then passes to arrangements that perform further processing, to a storage arrangement, and/or to a display arrangement. The circuit 200 includes two 4-input adders 210, 230, three 2-input adders 220, 240, 260, and a 2-input subtractor 250. The circuit also includes six limiters 280, whose function will be described in greater detail hereinafter.

The operation of the circuit 200 will be described with reference to the method 300 of FIG. 3. As mentioned previously, the method will be described with respect to operating on the pixel value of pixel Gb23, although those skilled in the art will appreciate that the circuit operates on each green pixel in the array. The method begins at block 302 when an image is captured by a sensor array of an image capture device and the array begins outputting pixels. At block 304, the next subject pixel is selected, in this case, Gb23. Once the circuit 200 receives the values of pixels Gb23, Gr12, Gr14, Gr32, and Gr34, the method continues at block 306.

At block 306, the 4-input adder 210 receives the pixel values for the four pixels Gr12, Gr14, Gr32, Gr34 that are in an immediately-adjacent, diagonal relationship to the subject pixel Gb23. The adder 210 combines the values, and the result may be rounded, averaged, truncated, and/or otherwise operated on. This produces the value avg(Gi). In some embodiments, the two least significant bits of the combination are truncated, which divides the combined value by 4, rounding down. In some embodiments, an additional constant is added (e.g., 2) prior to truncating, which produces a better rounded average. It should be appreciated that, in other embodiments, averaging may be accomplished by rounding to the nearest integer, which, in general, may be accomplished using more precise averaging methods and arrangements. Herein, however, averaging will be described as simply truncating bits, since all averages herein are multiples of 2, the effect being less accurate than rounding.

Figure 3:
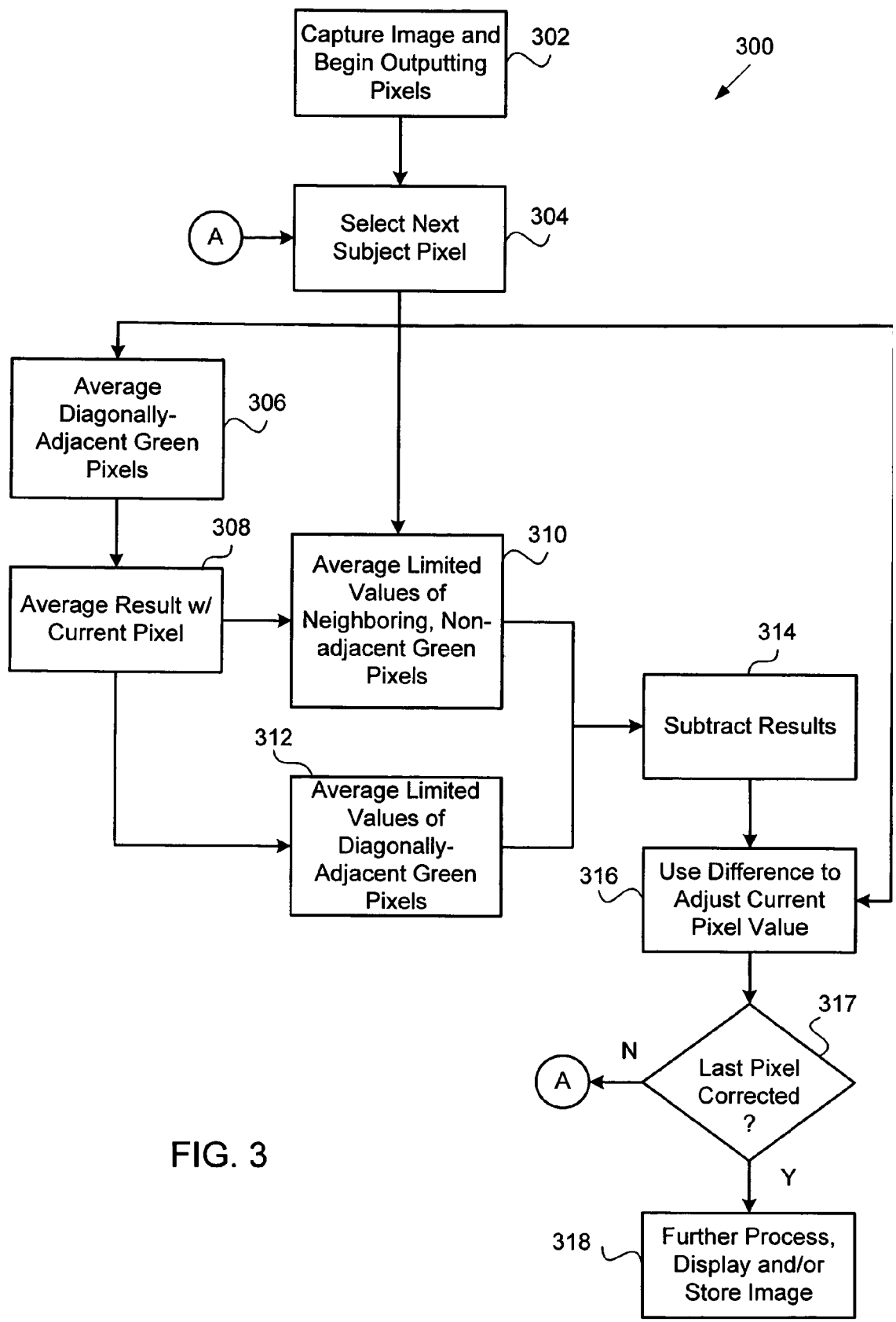
FIG. 3 depicts a method of correcting green disparity according to embodiments of the invention, which may be implemented in the circuit of FIG. 2.

Continuing with the method 300 of FIG. 3, at block 308, the adder 220 then averages avg(Gi) with the value of the current pixel. The output of the adder 220 may be used as an input to the limiters 280, whose operations will be described more fully below with reference to FIGS. 4 and 5. In short, however, the limiters 280 limit the pixel values to be averaged as a function of the output of the adder 220.

At block 310, the adder 230 averages the limited values of the four Gr pixels Gr12, Gr14, Gr32, Gr34. Again, averaging may be accomplished by truncating the two least significant bits of the adder output. Similarly, at block 312, the adder 240 averages the pixel values of the two pixels Gb21, Gb25. These two pixels are in the same row as the current pixel Gb23 and are each in an immediately-adjacent, diagonal relationship with two of the four pixels input into the adders 210 and 230.

Figure 4:
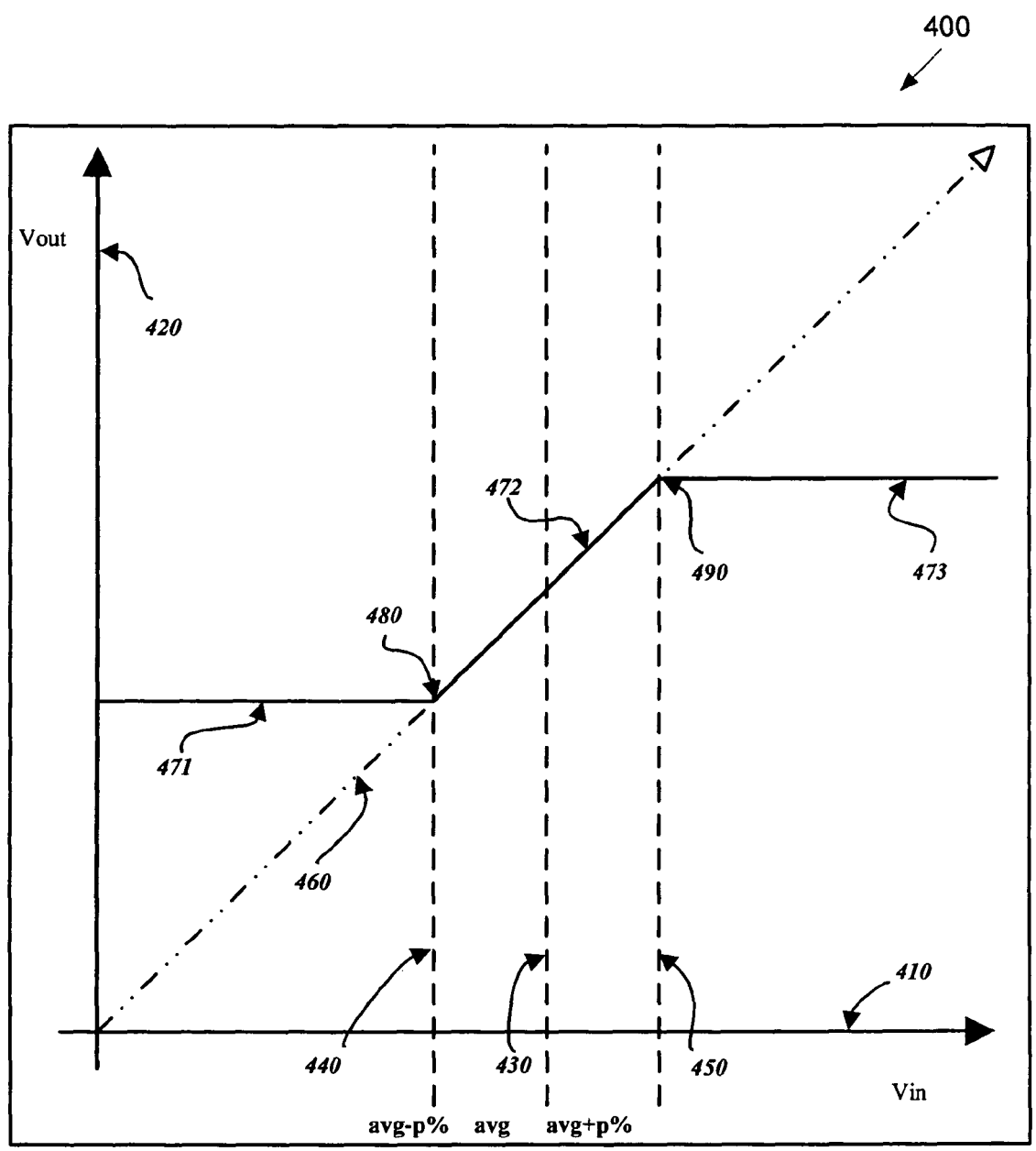
FIG. 4 graphically depicts a first embodiment of a transfer function that may be implemented in the circuit of FIG. 2.
Figure 5:
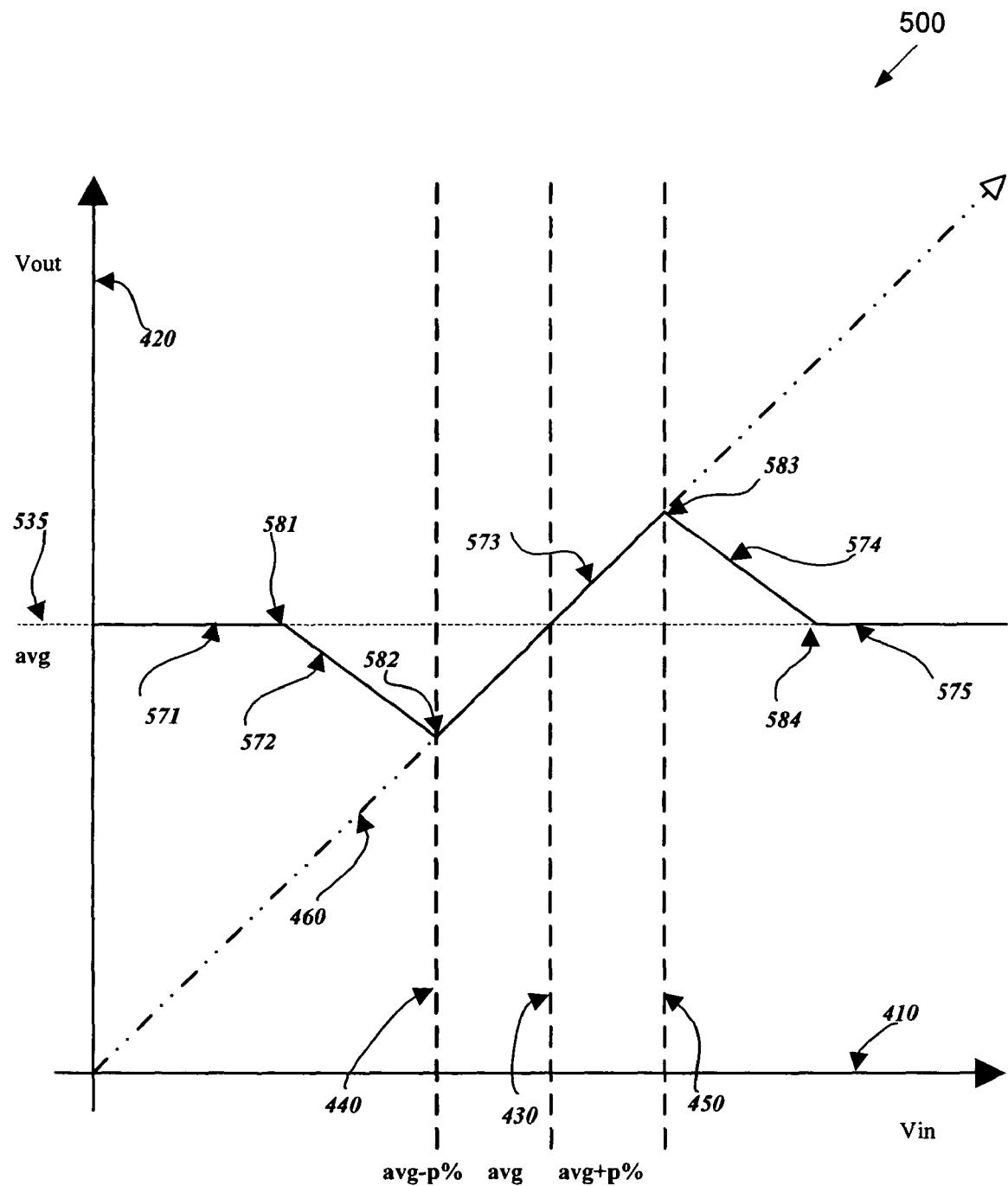
FIG. 5 graphically depicts a second embodiment of a transfer function that may be implemented in the circuit of FIG. 2.

At block 314, the subtractor 250 subtracts the output of the adder 240 from the output of the adder 230. The result is then divided by 2 by truncating the least significant bit. This difference is then added to the value of the current pixel Gb23 at block 316. A decision is made at block 317 whether additional pixels remain to be corrected. If so, the method returns to block 304. Otherwise, the method continues at block 318 at which point the resultant pixel value and/or image is further processed, saved, and/or displayed. The image is therefore displayed with green pixel disparity correction while preserving edges within the image. Having described an exemplary circuit and method according to embodiments of the invention, attention is directed to FIGS. 4 and 5, which illustrate two different transfer function embodiments that relate to the function of the limiters 280. The transfer function 400 of FIG. 4 is a monotonic transfer function while the transfer function 500 of FIG. 5 is a non-monotonic function. Those skilled in the art will appreciate that the embodiments of FIGS. 4 and 5 are merely exemplary of a number of possible embodiments of transfer functions that may be used to limit the values of pixels used in computing the disparity correction to be allied to a pixel.

FIGS. 4 and 5 both include a horizontal axis 410 that represents values of the incoming pixel (e.g., pixel Gb23 from FIGS. 1 and 2) and a vertical axis 420 that represents values of the limited output pixel (i.e., the output of the limiter 280 from FIG. 2). The vertical line 430 represents the output of the adder 220 from FIG. 2, which is the average value of the current pixel Gb23 and the unlimited average of the neighboring Gr pixels Gr12, Gr14, Gr32, and Gr34. The lines 440, 450 define an arbitrary range plus and minus a given percentage p at either side of the line 430. In some embodiments, p is a constant value, rather than a percentage of the average. The line 460 represents a transfer function where the output value is equal to the input value and is provided for reference.

The transfer function 400 of FIG. 4 includes three segments: a first horizontal segment 471; a diagonal segment 472; and a second horizontal segment 473. When the value of the incoming pixel is less than the value defined by vertical line 440, the value of the output pixel will follow the horizontal line segment 471 and the value of the output from the limiter 280 will be equal to the average (the output of the adder 220) minus p percent. When the value of the input pixel is between the average minus p percent and the average plus p percent, the value of the output from the limiter 280 will equal that of the input pixel following the line segment 472. When the value of the input pixel is grater than the average plus p percent, the output value of the limiter 280 will equal the average plus p percent, as illustrated by the segment 473. Hence, the transfer function is horizontal from Vin=0 to the point 480. Then from point the point 480 to the point 490, it merges with the diagonal line 460. Thereafter, from the point 490 to the maximum value of Vin, the function is horizontal.

The transfer function 400, as illustrated in FIG. 4, is monotonic, and, for growing values of the input pixel, the output will either grow or remain unchanged. When the input pixel deviates from the average by a large amount, however, it may be better to let the output equal the average, rather than p percent from the average. This concept is illustrated in the transfer function embodiment 500 of FIG. 5, which is a non-monotonic function.

The transfer function 500 of FIG. 5 also includes a range determined by a value p, which may be a constant or a percentage of the average (the output of the adder 220). The transfer function 500, however, includes five line segments: a horizontal segment 571; a negative-slope diagonal segment 572; a positive slope diagonal segment 573; a negative-slope diagonal segment 574; and a horizontal segment 575. An additional horizontal reference line 535 is included, whose value is equal to the average generated the adder 220.

When the value of the incoming pixel is less than a value defined by the point 581 or more than a value defined by the point 584, the output value from the limiter 280 equals the average as generated by the adder 220 of FIG. 2. The $V_{in}$ values of the points 581 and 584 may be programmable. When the value of the input pixel is between the point 581 and the point 582, the latter being equal to the average as generated by the adder 220 minus the percent p, the output value decreases with increasing values of the input pixel, as illustrated by the reverse slope segment 572. When the value of the input pixel is between the average minus p percent and the average plus p percent, the value of the output pixel equals that of the input pixel. When the value of the input pixel is greater than the average plus p percent but less than the value indicated by the point 584, the output value decreases with increasing values of the input pixel, as illustrated by the reverse slope segment 574. Lastly, when the value of the input pixel is more than that indicated by the point 584, the output value equals the average and the transfer function will again merge with horizontal line 435.

As is apparent to those ordinarily skilled in the art, other limiter functions could be used within the scope of the invention. The implementation of such limiter function may include comparators, adders and, in some cases, multipliers.

Having described several embodiments, it will be recognized by those of skill in the art that various modifications, alternative constructions, and equivalents may be used without departing from the spirit and scope of the invention. For example, in some embodiments, the invention is partially or fully implemented in software or micro-code. In some embodiments, different types of limiters, adaptive limiter functions, different averaging techniques, including for example, filtering with adaptive coefficients, all may be used. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of displaying a captured image, comprising:
   using an array of pixels to capture an image, wherein the array of pixels includes a first plurality of pixels of a first color, a second plurality of pixels of a second color, and a third plurality of pixels of a third color, wherein the pixels are arranged into rows and columns, and wherein the pixels of the third plurality of pixels have two different arrangements within the array of pixels with respect to neighboring pixels;
   for each pixel in the third plurality of pixels, normalizing a pixel value of said each pixel as a function of pixel values of at least six other pixels in the third plurality of pixels; and
   displaying the captured image using the normalized pixel value of said each pixel in the third plurality of pixels, wherein
      a first arrangement of the two different arrangements includes a green pixel having red pixels in its row and blue pixels in its column, and
      a second arrangement of the two different arrangements includes a green pixel having blue pixels in its row and red pixels in its column; and wherein normalizing the pixel value includes:
         combining the values of four pixels that are immediately diagonally adjacent to the pixel to produce a first average;
         combining the first average with the pixel value to produce a second average;
         combining limited pixel values for the four pixels that are immediately diagonally adjacent to the pixel to produce a third average, wherein the limited pixel values are a function of the second average;
         combining limited pixel values for two additional pixels in the third plurality of pixels to produce a fourth average, wherein the limited pixel values are a function of the second average and wherein the two additional pixels include two pixels nearest the pixel that are not immediately adjacent to the pixel;
         subtracting the fourth average from the third average to produce a result;
         dividing the result by two to produce a divided result; and
         combining the divided result with the pixel value to produce the normalized pixel value.

2. The method of claim 1, wherein the third color comprises green.

3. The method of claim 1, further comprising preprocessing the pixel value.

4. The method of claim 1, further comprising post-processing the pixel value.

5. The method of claim 1, wherein the array of pixels is arranged into a Bayer array.

6. The method of claim 1, wherein combining, in each instance, comprises adding the values followed by truncating one or more least significant bits.

7. The method of claim 1, wherein combining, in each instance, comprises averaging the values followed by rounding the result to the nearest integer.

8. The method of claim 1, wherein the two additional pixels are in the same row as the pixel.

9. The method of claim 1, wherein the two additional pixels are in the same column as the pixel.

10. The method of claim 1, wherein the limited pixel values are a monotonic function of the second average.

11. The method of claim 1, wherein the limited pixel values are a non-monotonic function of the second average.

12. A method of displaying an image captured by an image sensor array, wherein the array comprises a plurality of red pixels, a plurality of blue pixels, and a plurality of green pixels arranged in a Bayer array, each pixel having a pixel value associated therewith, wherein the pixels are arranged into rows and columns, wherein a first plurality of the green pixels, designated Gr pixels, are comprised by rows of pixels having only red and green pixels, and a second plurality of the green pixels, designated Gb pixels, are comprised by rows of pixels having only blue and green pixels, wherein the rows of pixels having Gr pixels and the rows of pixels having Gb pixels are in an alternating relationship in the image sensor array, the method comprising:
   for each of a plurality of Gb pixels in the pixel array:
      receiving a pixel value for the Gb pixel, wherein the Gb pixel comprises a subject pixel;
      receiving pixel values for four Gr pixels that are in an immediately adjacent diagonal relationship with the subject Gb pixel;
      receiving pixel values for two additional Gb pixels, wherein the subject Gb pixel and the two additional Gb pixels are comprised by a common row, wherein the subject Gb pixel is between the two additional Gb pixels, and wherein the two additional Gb pixels are each in an immediately adjacent diagonal relationship with two of the four Gr pixels;
      combining the pixel values of the four Gr pixels to produce Avg(Gr);
      combining the pixel value of the subject Gb pixel with Avg(Gr) to produce a first LimInput;
      combining limited pixel values of the four Gr pixels to produce LimAvg(Gr), wherein the limited pixel values are a function of the first LimInput;
      combining limited pixel values of the two remaining Gb pixels to produce LimAvg(Gb), wherein the limited pixel values are a function of the first LimInput; and
      subtracting LimAvg(Gb) from LimAvg(Gr), dividing the result by two, then using the divided result to correct the pixel value of the subject Gb pixel, thereby producing a corrected pixel value; and
   displaying the captured image using one or more corrected pixel values.

13. The method of claim 12, further comprising:
   for each of a plurality of Gr pixels in the pixel array:
      receiving a pixel value for the Gr pixel, wherein the Gr pixel comprises a subject pixel;
      receiving pixel values for four Gb pixels that are in an immediately adjacent diagonal relationship with the subject Gr pixel;

receiving pixel values for two additional Gr pixels, wherein the subject Gr pixel and the two additional Gr pixels are comprised by a common row, wherein the subject Gr pixel is between the two additional Gr pixels, and wherein the two additional Gr pixels are each in an immediately adjacent diagonal relationship with two of the four Gb pixels;

combining the pixel values of the four Gb pixels to produce Avg(Gb);

combining the pixel value of the subject Gr pixel with Avg(Gb) to produce a second LimInput;

combining limited pixel values of the four Gb pixels to produce LimAvg(Gb), wherein the limited pixel values are a function of the second LimInput;

combining limited pixel values of the two remaining Gr pixels to produce LimAvg(Gr), wherein the limited pixel values are a function of the second LimInput; and subtracting LimAvg(Gr) from LimAvg(Gb), dividing the result by two, then using the divided result to correct the pixel value of the subject Gr pixel, thereby producing a corrected pixel value.

14. The method of claim 13, wherein combining, in each instance, comprises adding the values followed by truncating one or more least significant bits.

15. The method of claim 13, wherein combining, in each instance, comprises averaging the values followed by rounding the result to the nearest integer.

16. The method of claim 13, wherein the limited pixel values are a monotonic function of the first and second LimInput.

17. The method of claim 13, wherein the limited pixel values are a non-monotonic function of the first and second LimInput.

18. An arrangement configured to process pixel values relating to an image captured by an image capture device, the image capture device being a hardware based system and including a Bayer array of pixels, the Bayer array of pixels including a first plurality of pixels of a first color, a second plurality of pixels of a second color, and a third plurality of pixels of a third color, wherein the pixels are arranged into rows and columns, and wherein the pixels of the third plurality of pixels have two different arrangements within the Bayer array of pixels with respect to neighboring pixels, the arrangement comprising:

means for normalizing a pixel value of each pixel in the third plurality of pixels of the Bayer array of pixels as a function of pixel values of at least six other pixels in the third plurality of pixels of the Bayer array of pixels, and means for displaying the captured image using the normalized pixel value of said each pixel in the third plurality of pixels, wherein a first arrangement of the two different arrangements includes a green pixel having red pixels in its row and blue pixels in its column, and a second arrangement of the two different arrangements includes a green pixel having blue pixels in its row and red pixels in its column; and wherein the means for normalizing the pixel value includes:

means for averaging the values of four pixels that are immediately diagonally adjacent to the pixel to produce a first average;

means for averaging the first average with the pixel value to produce a second average;

means for averaging limited pixel values for the four pixels that are immediately diagonally adjacent to the pixel to produce a third average, wherein the limited pixel values are a function of the second average;

means for averaging limited pixel values for two additional pixels in the third plurality of pixels to produce a fourth average, wherein the limited pixel values are a function of the second average and wherein the two additional pixels include two pixels nearest the pixel that are not immediately adjacent to the pixel;

means for subtracting the fourth average from the third average to produce a result;

means for dividing the result by two to produce a divided result; and means for combining the divided result with the pixel value to produce the normalized pixel value.

19. The arrangement of claim 18, wherein the third color comprises green.

20. A circuit configured to process pixel values relating to an image captured by an image capture device, the image capturing device including an array of pixels, wherein the array of pixels includes a first plurality of pixels of a first color, a second plurality of pixels of a second color, and a third plurality of pixels of a third color, wherein the pixels are arranged into rows and columns, and wherein the pixels of the third plurality of pixels have two different arrangements within the array of pixels with respect to neighboring pixels, the circuit comprising:

an arrangement configured to normalize the pixel value of each pixel in the third plurality of pixels as a function of the pixel values of at least six other pixels in the third plurality of pixels, wherein a first arrangement of the two different arrangements includes a green pixel having red pixels in its row and blue pixels in its column, and a second arrangement of the two different arrangements includes a green pixel having blue pixels in its row and red pixels in its column; and wherein the arrangement configured to normalize the pixel value includes:

a first adder configured to average the values of four pixels that are immediately diagonally adjacent to the pixel to produce a first average;

a second adder configured to average the first average with the pixel value to produce a second average;

a third adder configured to average limited pixel values for the four pixels that are immediately diagonally adjacent to the pixel to produce a third average, wherein the limited pixel values are a function of the second average;

a fourth adder configured to average limited pixel values for two additional pixels in the third plurality of pixels to produce a fourth average, wherein the limited pixel values are a function of the second average and wherein the two additional pixels include two pixels nearest the pixel that are not immediately adjacent to the pixel;

a subtractor configured to subtract the fourth average from the third average to produce a result;

a divider configured to divide the result by two to produce a divided result; and a fifth adder configured to combine the divided result with the pixel value to produce the normalized pixel value.

21. The circuit of claim 20, wherein the third color comprises green and wherein the array of pixels is arranged into a Bayer array.

* * * * *